Figure 1:
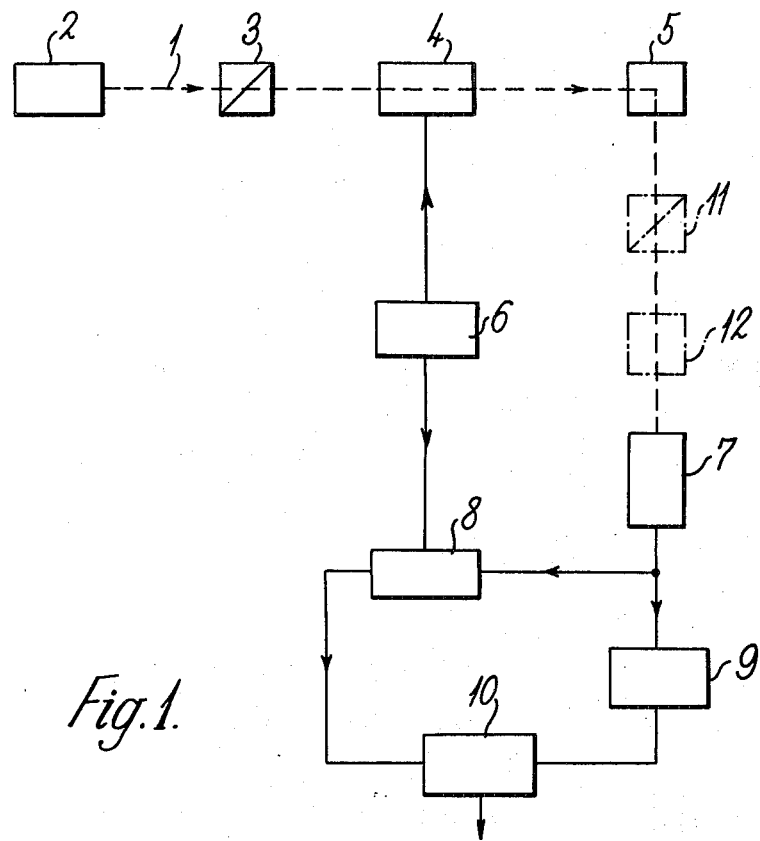

United States Patent [19]
Barron et al.

[11] 3,817,634
[45] June 18, 1974

[54] TESTING OF OPTICALLY ACTIVE SUBSTANCES BY POLARIZED RADIATION

[75] Inventors: Laurence David Barron; Amyand David Buckingham, both of Cambridge, England

[73] Assignee: National Research Development Corporation, London, England

[22] Filed: Feb. 29, 1972

[21] Appl. No.: 230,406

[30] Foreign Application Priority Data
Mar. 10, 1971 Great Britain...................... 6454/71

[52] U.S. Cl...................... 356/114, 356/75, 356/117
[51] Int. Cl............................................. G01j 3/44
[58] Field of Search.............. 356/75, 103, 114, 117

[56] References Cited
UNITED STATES PATENTS
3,499,159   3/1970   Carrier et al................... 356/117 X
3,612,688  10/1971   Liskowitz........................ 356/114 X
3,697,180  10/1972   Mori et al....................... 356/114 X

*Primary Examiner*—Ronald L. Wibert
*Assistant Examiner*—Paul K. Godwin
*Attorney, Agent, or Firm*—Cushman, Darby & Cushman

[57] ABSTRACT

In testing a sample of an optically active substance, the sample is irradiated with polarized electromagnetic radiation and the intensity of radiation scattered from the sample in a given direction is detected. The state of polarization of the incident radiation from which the detected radiation is derived is modulated, preferably by alternating it between right and left circular polarization, to cause a periodic variation of the detected intensity, and a signal related to this variation is derived.

21 Claims, 2 Drawing Figures

PATENTED JUN 18 1974 3,817,634

TESTING OF OPTICALLY ACTIVE SUBSTANCES BY POLARIZED RADIATION

This invention relates to the testing of optically active substances, which term is to be interpreted as comprising both substances exhibiting natural optical activity and substances exhibiting optical activity when disposed in a magnetic field; the term "optical activity" is used here in the broad sense of referring to the rotation of the plane of polarization of a linearly polarized electromagnetic wave, regardless of whether or not the wavelength lies in the optical part of the spectrum.

Various techniques utilizing different phenomena associated with optical activity are presently in use in the investigation of optically active substances; for example, reference may be made to the techniques known as optical rotatory dispersion (O.R.D.) and circular dichroism (C.D.), which are capable of providing valuable information about molecular structure and conformation. In general, however, these tehcniques involve observations on the radiation transmitted through a sample, and are thus limited in respect of the types of substance with which they can be used.

The present invention provides a technique which is not subject to this limitation and which moreover is capable of providing information of kinds which cannot be obtained with known techniques.

The invention is based upon the realisation that if a sample of an optically active substance is irradiated with polarized electromagnetic radiation, then the intensity of radiation scattered by the sample in a given direction will differ for different states of polarization of the incident radiation, and in particular will be different for right and left circularly polarized incident radiation; this intensity difference applies to both Rayleigh and Raman scattering.

The theory of the scattering effects on which the present invention relies is of a complex nature, and no attempt will be made to reproduce it in detail here. It may be explained briefly, however, that for optically active molecules the effects concerned arise from interference between the polarizability tensor $\alpha$, which gives the electric dipole moment induced in the molecule by the electric field of an electromagnetic wave and which characterises the normal type of scattering shown by all molecules, and the optical activity tensors G and A, which give the electric dipole moments respectively induced by the magnetic field and the electric field gradient of the wave. Thus for an optically active molecule the intensity of radiation scattered from the molecule involves a contribution proportional to $\alpha g$, where $g$ (the optical activity) is equal to $G + A$, in addition to a contribution proportional to $\alpha^2$ which arises from the normal type of scattering. The $\alpha g$ scattering is of the order of 1,000 times weaker than the $\alpha^2$ scattering; it is, however, dependent on the ellipticity of the incident radiation whereas the $\alpha^2$ scattering is not necessarily dependent on this ellipticity. In particular the $\alpha g$ scattering is different but the $\alpha^2$ scattering is the same for right and left circularly polarized incident radiation, giving rise to the circular intensity differential. An appropriate measure of this is given by the ratio $(I_R - I_L)/(I_R + I_L)$, which is approximately equal to $\alpha g/\alpha^2$, $I_R$ and $I_L$ respectively being the intensities of scattered radiation from right and left circularly polarized radiation of a given intensity.

In general the radiation scattered from a molecule has a Rayleigh component with the same frequency as the incident radiation, and a weaker Raman spectrum of components each of which is shifted in frequency relative to the incident radiation by an amount equal to a vibrational frequency of the molecule. Thus for optically active molecules the circular intensity differential for the Rayleigh component provides information concerning the optical activity, while those of the Raman components provide information concerning the variation of the optical activity with the vibrational co-ordinates.

Similar considerations to those set out above for optically active molecules apply in the case of molecules, crystals, plasmas, etc. which are not naturally optically active but in which optical activity is induced by a magnetic field. The induced optical activity can be characterised by a polarizability $g'$ (dependent on the magnetic field) which takes the place of the natural optical activity $g$.

According to one aspect of the invention a method of testing a sample of an optically active substance comprises detecting the intensity of electromagnetic radiation which has been scattered in a given direction as a result of irradiation of the sample with polarized electromagnetic radiation, imposing a periodic variation on the detected intensity by modulating the effective state of polarization of the incident radiation from which the detected scattered radiation is derived, and deriving a signal related to said variation.

According to another aspect of the invention, an apparatus for use in testing a sample of an optically active substance comprises a detection system for detecting the intensity of electromagnetic radiation travelling from the sample in a given direction, means for irradiating the sample with polarized electromagnetic radiation so that radiation will be scattered from the sample in said given direction, means for modulating the effective state of polarization of the incident radiation from which the detected scattered radiation is derived so as to impose a periodic variation on the detected intensity, and means for deriving a signal related to said variation.

The derived signal may be utilised simply to provide information concerning the substance under test; in some cases it may also be used to operate a control or an alarm relating to a process involving the substance.

Preferably the incident radiation is arranged to be monochromatic; it will normally be most convenient for it to be incident on the sample in a direction different from said given direction.

The detected intensity may be the total intensity of the radiation scattered in said given direction, or it may be the intensity of a component of that radiation which has a given frequency and/or is linearly polarized in a given plane.

Where the optical activity of the substance is magnetically induced, it is preferred that the direction of the radiation incident on the sample should be parallel to the direction of the magnetic field in which the sample is disposed.

Preferably the modulation is such as to alternate the effective state of polarization of the incident radiation from which the detected scattered radiation is derived between right and left circular polarization. Examples of ways in which this can be effected are as follows:

a. The sample may be irradiated continuously with a single beam of radiation which is initially linearly polarized and which is passed through a modulating device that changes the state of polarization of the beam alternately to right and left circular polarization; where the radiation is light (which term includes infra-red and ultra-violet radiation as well as visible radiation), the modulating device is preferably an electro-optic modulator of the kind utilising the linear electro-optic effect, but it may alternatively be an elasto-optic modulator, a magneto-optic modulator, a mechanically rotated wave plate or a mechanically rotated polariser in conjunction with a fixed wave plate.

b. The sample may be irradiated with two parallel beams of radiation which are respectively right and left circularly polarized, the modulating means being operative to cause the detection system to respond alternately to radiation scattered from the two beams. Thus the detection system may comprise a single detector arranged to detect radiation scattered from either beam, a mechanical chopper being arranged to obturate alternately either the two beams or the radiation scattered from the two beams. Alternatively the detection system may comprise a pair of detectors respectively arranged to detect radiation scattered from the two beams, the outputs of the detectors being alternately switched to a single output channel.

c. Where the optical activity of the substance is magnetically induced, the sample may be irradiated continuously with a single beam of circularly polarized radiation directed parallel to the magnetic field in which the sample is disposed, the sense of this field being periodically reversed. The reversal of the sense of the magnetic field is equivalent to a reversal of the sense of the circular polarization of the incident beam, and it may thus be regarded as changing the effective state of polarization of the incident beam with respect to the sample.

Since the difference between the intensities of the scattered radiation for right and left circularly polarized incident radiation of a given intensity is much smaller than those intensities themselves, it is necessary to take precautions to ensure that spurious results are not obtained in the cases (a) and (b) referred to above due to a lack of balance as between the two states of polarization in respect of either the means used to irradiate the sample or the system used to detect the scattered radiation. This point can be dealt with by providing some means whereby the incident intensity for one state of polarization can be adjusted relative to that for the other, the correctness of the adjustment being checked by carrying out a test on a sample of a substance that is not optically active and hence should give a zero signal.

For various practical reasons the system (a) described above will normally be preferred, at least for substances exhibiting natural optical activity. It should be noted, however, that with this system it may be necessary in some circumstances to take further precautions to avoid inaccuracies arising from the occurrence of spurious components in the signal derived from the detection system. In order to explain this point it is appropriate to consider further the nature of the variation of the intensity of the scattered radiation with the state of polarization of the incident radiation for certain typical cases. It is convenient to denote the scattering plane (that is the plane containing the directions of the incident and scattered radiation) as the $yz$ plane in a system of Cartesian co-ordinates, with the direction of the incident radiation coinciding with the $z$-axis; it should be noted that where the scattering angle (that is the angle between the directions of the incident and scattered radiation) has a value of zero of 180°, corresponding respectively to forward and backward scattering, there is no unique scattering plane. The state of polarization of the incident radiation is then defined in terms of the parameters of the conventional polarization ellipse in the $xy$ plane, namely the azimuth $\theta$ (that is the angle between the $x$-axis and the major axis of the ellipse) and the ellipticity $\eta$ (that is the angle hose tangent is equal to the ratio of the lengths of the minor and major axes of the ellipse); $\eta$ has respective values of zero, 45° and −45° for linearly polarized, left circularly polarized and right circularly polarized incident radiation.

The intensity of the scattered radiation for certain typical cases is given by the following equations:

$$I(90°) \propto B + C\cos2\eta \cos2\theta - D\sin2\eta \tag{1}$$

$$I_x(90°) \propto B + C + 2C\cos2\theta\cos2\theta - (D+E)\sin2\eta \tag{2}$$

$$I_z(90°) \propto B - C - (D-E)\sin2\eta \tag{3}$$

$$I(0,180°) \propto B + C - F\sin2\eta \tag{4}$$

In these equations $I(90°)$ is the total intensity of scattered radiation for a scattering angle of 90°, $I_x(90°)$ and $I_z(90°)$ are the intensities of those components of that radiation which are linearly polarized respectively perpendicular and parallel to the scattering plane, $I(0,180°)$ represents the total intensity of scattered radiation for forward or backward scattering, and $B$, $C$, $D$, $E$ and $F$ are functions of the tensor properties of the scattering molecules, $B$ and $C$ being related to the $\alpha^2$ scattering and $D$, $E$ and $F$ being related to the $\alpha g$ scattering; it is the functions $D$, $E$ and $F$ concerning which information is sought. It will be appreciated that from the equations given above it is readily possible to derive expressions for the value of the circular intensity differential in each case; for example in case (1) $I_R$ and $I_L$ are respectively porportional to ($B + D$) and ($B − D$) and hence the value of $(I_R − I_L)/(I_R + I_L)$ is equal to $D/B$.

In measuring the circular intensity differential using the system (a) referred to above, the detected intensity of the scattered radiation will of course vary periodically due to the variation of the ellipticity $\eta$ caused by the modulating device. In cases (3) and (4), the variation of the detected intensity will involve only a single component resulting from the term involving $\sin 2\eta$, and thus no special problem will arise in making a measurement; it should be noted, however, that the detection of forward or backward scattering, involved in case (4), is less convenient from a practical point of view than the detection of scattering at 90°. In cases (1) and (2), on the other hand, in addition to the wanted component resulting from the term involving sin $2\eta$, the variation of the detected intensity may also involve an unwanted component resulting from the term involving cos $2\eta$. If the modulation were of an ideal form involving instantaneous changes between perfect right and left circular polarization, the unwanted component would of course disappear, since the value of cos $2\eta$ would always be zero; in practice it is impossible to achieve such an ideal form of modulation, although it can be more closely approached when using an electro-optic modulator than when using the other types of modulating device referred to above. The magnitude of the unwanted component can, however, be minimised by arranging for the plane of polarisation of the initial linearly polarized beam to be oriented at an angle of 45° to the scattering plane, the value of cos $2\theta$, and hence of the term involving cos $2\eta$, then in principle being zero.

Figure 2:
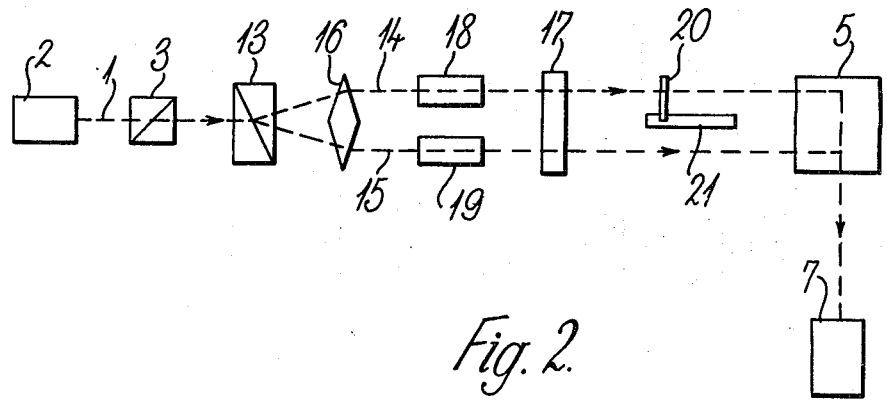

Two arrangements in accordance with the invention will now be described by way of example with reference to the accompanying drawings, in which:

FIG. 1 is a diagram illustrating both the optical layout and the electrical circuit of a first form of apparatus for use in testing a sample of an optically active substance; and FIG. 2 is a diagram illustrating the optical layout of part of a second form of apparatus for this purpose.

Referring to FIG. 1, a collimated beam 1 of monochromatic light, derived from a source 2 such as a laser, is arranged to pass firstly through a polarizer 3 and then through an electro-optic modulator 4 of the type utilising the linear electro-optic effect, before impinging on a sample contained in a holder 5. The beam 1 is linearly polarized by the polarizer 3, and the modulator 4 has applied to it a square-wave modulating voltage, derived from a generator 6, such that when it leaves the modulator 4 the beam 1 is alternately right and left circularly polarized; the modulating voltage may suitably have a frequency of about 300 Hz. A photo-multiplier 7 is disposed so as to detect light scattered from the sample in a selected direction. The position of the photo-multiplier 7 may be made variable along an arc where it is desired to investigate scattering at different angles, or it may be fixed; in the latter case, it will normally be preferred for the photomultiplier 7 to be positioned so as to detect light scattered at an angle of 90°. An output from the photomultiplier 7 is fed to a phase sensitive detector 8, to which is applied a reference signal derived from the generator 6, the output of the detector 8 being in the form of a unidirectional signal whose magnitude is proportional to the difference between $I_R$ and $I_L$ and whose polarity is dependent on the sense of this difference. The modulator 4 is adjusted, for example by means of a unidirectional bias voltage superimposed on the modulating voltage, so that the output of the detector 8 is zero when a sample that is not optically active is disposed in the holder 5. A further output from the photomultiplier 7 is applied to a smoothing circuit 9, the output from which is in the form of a unidirectional signal whose magnitude is proportional to the sum of $I_R$ and $I_L$. The signals from the detector 8 and smoothing circuit 9 are applied to a combining circuit 10 to produce a resultant signal proportional to the ratio of the difference and sum signals. In view of the relatively small magnitude of the circular intensity differential, it will normally be necessary for this resultant signal to be integrated over a period corresponding to a large number of cycles of the modulation to enable accurate results to be obtained. The integrated signal is arranged to operate a conventional indicating instrument or recorder (not shown).

For certain types of measurement additional components are interpolated in the path of the scattered light between the holder 5 and the photomultiplier 7. Thus, where it is desired to measure the circular intensity differential for a component of the scattered light which is linearly polarized in a given plane, an appropriately orientated polarizer 11 is introduced, and where it is desired to investigate a Raman circular intensity differential a monochromator 12 is introduced to select light of the relevant frequency.

It will be appreciated from the general discussion above that in appropriate cases it will be desirable for the polarizer 3 to be orientated so that the beam 1 is linearly polarized at an angle of 45° to the scattering plane when it enters the modulator 4, so as to minimise any unwanted alternating component in the output of the photomultiplier 7.

Turning now to FIG. 2, in which components similar to those shown in FIG. 1 are identified by similar reference numerals, in this case after being linearly polarized the beam 1 is split by means of a Wollaston prism 13, the two resultant beams 14 and 15 being rendered parallel by means of a bi-prism 16. The beams 14 and 15 are arranged to pass through a quarter-wave plate 17, the combined effect of the prism 13 and the plate 17 being that one of the beams 14 and 15 is right circularly polarized and the other is left circularly polarised. The beams 14 and 15 are also arranged to pass respectively through optical attenuators 18 and 19, the attenuator 18 being adjustable and the attenuator 19 being fixed. The beams 14 and 15 are arranged to impinge alternately on a sample in the holder 5, by means of a mechanical chopper comprising a semi-circular blade 20 mounted on a shaft 21 which extends parallel to and half way between the paths of the beams 14 and 15, the shaft 21 being rotatable by means of an alternating current motor (not shown).

The photomultiplier 7 is disposed so as to detect light scattered from the sample in a direction perpendicular to, and lying in the plane common to the axes of, the beams 14 and 15, so that the detected light is derived alternately from the beams 14 and 15. The apparatus further includes components (not shown) corresponding to the components 8, 9 and 10 shown in FIG. 1; in this case the reference signal applied to the phase sensitive detector is derived from the supply circuit for the motor driving the chopper. The attenuator 18 is adjusted so that the output of the phase sensitive detector is zero when a sample that is not optically active is disposed in the holder 5. As before, a polarizer and monochromator may be interposed between the sample holder 5 and the photomultiplier 7 when required.

The forms of apparatus described above may be used for investigating either substances exhibiting natural optical activity or substances exhibiting magnetically induced optical activity. In the latter case, of course, a suitable means (not shown) must be provided to establish the relevant magnetic field within the holder 5, preferably parallel to the direction of the beam 1. This means may for example take the form of coils disposed so as not to obstruct the paths of the incident beam or beams and the scattered light to be detected.

In alternative embodiments of the invention, the arrangements shown in FIGS. 1 and 2 may be modified by omitting the components 8, 9 and 10 and arranging for the output from the photomultiplier 7 to be switched alternately to a pair of matched photon counters in synchronism with the modulation of the light incident on the sample, the counts accumulated by the counters over a given number of cycles of the modulation (which are respectively proportional to $I_R$ and $I_L$) being utilised as inputs to an electronic computing device which provides an output signal representing the ratio $(I_R-I_L)/(I_R+I_L)$. With this technique it is possible to use much longer integrating times than is the case with conventional phase sensitive detectors, thereby enabling greater accuracy to be achieved and the limit of detection sensitivity to be improved.

In using the arrangements described above to investigate the Rayleigh circular intensity differential, it may be advantageous to use a tunable laser as the source 2, since adjustment of the frequency of the laser to coincide with an absorption frequency of the substance under investigation will normally result in a substantial enhancement of the value of the Rayleigh circular intensity differential.

Possible advantageous applications of the techniques provided by the invention are as follows:

A. Rayleigh circular intensity differential

The Rayleigh circular intensity differential measures the optical activity of gaseous, liquid, and solid samples in any condition, whereas O.R.D. and C.D. are restricted to samples that transmit an appreciable amount of radiation.

O.R.D. and C.D. can measure only the isotropic part of the tensor G, and the tensor A does not contribute to O.R.D. and C.D. in fluids and cannot normally be measured with these techniques. By contrast, the Rayleigh circular intensity differential depends on other components of $G$ in addition to the isotropic part, and also on components of $A$; these contributions can be distinguished by observing the polarized circular intensity differentials parallel and perpendicular to the scattering plane and by varying the scattering angle.

The Rayleigh circular intensity differential could replace optical rotation to measure concentrations of optically active materials in, for example, the sugar industry, and could be used to monitor chemical rate processes involving optically active materials.

B. Raman circular intensity differential

The circular intensity differential of Raman-scattered radiation measures the variation of the optical activity with the modes of vibration of the molecule, and can be applied to gaseous, liquid and solid samples in any condition. The circular intensity differential of totally symmetric vibrations measures the variation of the isotropic and anisotropic parts of the optical activity, and that of non-totally symmetric vibrations measures the variation of the anisotropic part of the optical activity.

The Raman circular intensity differential should provide valuable information about structure and conformation of complex optically active molecules by probing the dissymmetric environments of functional groups. Whereas O.R.D. and C.D. are limited to investigating the environments of groups with visible or near ultra-violet absorption bands, the Raman circular intensity differential could provide information about the environment of the many more groups with characteristic "fingerprints" in the vibrational spectrum. Many regions of complicated optically active molecules could be susceptible to this type of study, and it should prove valuable in organic, biological and pharmaceutical chemistry.

Mixtures of optically active materials, or materials with optically active contaminants, could be monitored, because each optically active species will have a fingerprint in the Raman spectrum with characteristic circular intensity differentials shown by the various bands. This has particular relevance in connection with the sugar industry.

C. Magnetically induced Rayleigh and Raman circular intensity differential

The magnetically induced Rayleigh circular intensity differential should provide analogous information about the structure of molecules, crystals, etc., to that obtained from the Faraday effect, but in addition it can be used on non-transparent and amorphous materials. The magnetically induced Raman circular intensity differential would provide additional information; for example it could play an important role in the analysis of molecular vibrations.

Radiation scattered from the surface of magnetic metals will show the circular intensity differential, which should be useful for investigating their structure. This is related to the well-known Kerr magneto-optic effect.

Finally, the magnetically induced circular intensity differential could be used to measure, and monitor changes in, magnetic fields in inaccessible situations, for example in the plasma inside a nuclear fusion reactor.

We claim:

1. A method of testing a sample of an optically active substance, the method comprising:

detecting the intensity of a selected component of electromagnetic radiation which has been scattered in a given direction as a result of irradiation of the sample with polarized monochromatic light, said selected component being a component resulting from Raman scattering so as to have a frequency different from that of said monochromatic light;

imposing a periodic variation on the detected intensity solely by modulating the ellipticity of the incident light from which the detected scattered radiation is derived; and deriving a signal related to said variation.

2. A method according to claim 1, in which the modulation alternates the effective state of polarization of said incident light between right and left circular polarization.

3. A method according to claim 2, in which said monochromatic light is directed onto the sample in a second direction perpendicular to said given direction.

4. A method according to claim 3, in which said selected component is linearly polarized parallel to the plane containing said given direction and said second direction.

5. A method according to claim 3, in which said selected component is linearly polarized perpendicular to the plane containing said given direction and said second direction.

6. A method of testing a sample of an optically active substance, the method comprising:

detecting the intensity of a selected component of electromagnetic radiation which has been scattered in a given direction as a result of irradiation of the sample with polarized electromagnetic radiation which is directed onto the sample in a second direction perpendicular to said given direction, said selected component being a component which is linearly polarized parallel to the plane containing said given direction and said second direction;

imposing a periodic variation on the detected intensity solely by modulating the ellipticity of the incident radiation from which the detected scattered radiation is derived; and deriving a signal related to said variation.

7. A method according to claim 6, in which the modulation alternates the effective state of polarization of said incident radiation between right and left circular polarization.

8. A method of testing a sample of an optically active substance, the method comprising:

detecting the intensity of a selected component of electromagnetic radiation which has been scattered in a given direction as a result of irradiation of the sample with polarized electromagnetic radiation which is directed onto the sample in a second direction perpendicular to said given direction, said selected component being a component which is linearly polarized perpendicular to the plane containing said given direction and said second direction;

imposing a periodic variation on the detected intensity solely by modulating the ellipticity of the incident radiation from which the detected scattered radiation is derived; and deriving a signal related to said variation.

9. A method according to claim 8, in which the modulation alternates the effective state of polarization of said incident radiation between right and left circular polarization.

10. An apparatus for use in testing a sample of an optically active substance, the apparatus comprising:

a detection system for detecting the intensity of electromagnetic radiation travelling from the sample in a given direction;

means for irradiating the sample with polarized monochromatic light so that radiation will be scattered from the sample in said given direction;

selecting means operative to render said detection system responsive only to a selected component of the radiation scattered in said given direction, said selecting means incorporating a monochromator disposed in the path of the radiation scattered in said given direction and operative to select light having a given frequency corresponding to a component of the Raman spectrum of the scattered radiation;

modulating means operative to impose a periodic variation on the detected intensity solely by modulating the ellipticity of the incident light from which the detected scattered radiation is derived; and means for deriving a signal related to said variation.

11. An apparatus according to claim 10, in which said modulating means is operative to alternate the effective state of polarization of said incident light between right and left circular polarization.

12. An apparatus according to claim 11, in which said irradiating means is operative to direct said monochromatic light onto the sample in a second direction perpendicular to said given direction.

13. An apparatus according to claim 12, in which said irradiating means is operative to irradiate the sample continuously with a single beam of light which is initially polarized at an angle of 45° to the plane containing said given direction and said second direction, and said modulating means comprises a modulating device through which said beam passes before falling on the sample and which changes the state of polarisation of said beam alternately to right and left circular polarisation.

14. An apparatus according to claim 12, in which said selecting means further incorporates a polariser disposed in the path of the radiation scattered in said given direction and operative to select radiation which is linearly polarised parallel to the plane containing said given direction and said second direction.

15. An apparatus according to claim 12, in which said selecting means further incorporates a polariser disposed in the path of the radiation scattered in said given direction and operative to select radiation which is linearly polarised perpendicular to the plane containing said given direction and said second direction.

16. An apparatus for use in testing a sample of an optically active substance, the apparatus comprising:

a detection system for detecting the intensity of electromagnetic radiation travelling from the sample in a given direction;

means for irradiating the sample with polarised electromagnetic radiation which is directed onto the sample in a second direction perpendicular to said given direction so that radiation will be scattered from the sample in said given direction;

selecting means operative to render said detection system responsive only to a selected component of the radiation scattered in said given direction, said selecting means incorporating a polariser disposed in the path of the radiation scattered in said given direction and operative to select radiation which is linearly polarised parallel to the plane containing said given direction and said second direction;

modulating means operative to impose a periodic variation on the detected intensity solely by modulating the ellipticity of the incident radiation from which the detected scattered radiation is derived; and means for deriving a signal related to said variation.

17. An apparatus according to claim 16, in which said modulating means is operative to alternate the effective state of polarisation of said incident radiation between right and left circular polarisation.

18. An apparatus for use in testing a sample of an optically active substance, the apparatus comprising:

a detection system for detecting the intensity of electromagnetic radiation travelling from the sample in a given direction;

means for irradiating the sample with polarised electromagnetic radiation which is directed onto the sample in a second direction perpendicular to said given direction so that radiation will be scattered from the sample in said given direction;

selecting means operative to render said detection system responsive only to a selected component of the radiation scattered in said given direction, said selecting means incorporating a polariser disposed in the path of the radiation scattered in said given direction and operative to select radiation which is linearly polarised perpendicular to the plane containing said given direction and said second direction;

modulating means operative to impose a periodic variation on the detected intensity solely by modulating the ellipticity of the incident radiation from which the detected scattered radiation is derived; and means for deriving a signal related to said variation.

19. An apparatus according to claim 18, in which said modulating means is operative to alternate the effective state of polarisation of said incident radiation between right and left circular polarisation.

20. An apparatus according to claim 19, in which said irradiating means is operative to irradiate the sample continuously with a single beam of radiation which is initially linearly polarised at an angle of 45° to the plane containing said given direction and said second direction, and said modulating means comprises a modulating device through which said beam passes before falling on the sample and which changes the state of polarisation of said beam alternately to right and left circular polarisation.

21. An apparatus for use in testing a sample of an optically active substance, the apparatus comprising:

a detection system for detecting the intensity of electromagnetic radiation travelling from the sample in a given direction;

mans for irradiating the sample with two parallel beams of electromagnetic radiation so that radiation will be scattered from the sample in said given direction, said two beams being derived from a common source but being respectively right and left circularly polarised;

modulating means operative to impose a periodic variation on the detected intensity solely by causing said detection system to respond alternately to radiation scattered respectively from said two beams; and means for deriving a signal related to said variation.

* * * * *